US009932255B2

(12) United States Patent
Hoots et al.

(10) Patent No.: US 9,932,255 B2
(45) Date of Patent: Apr. 3, 2018

(54) METAL SILICATE AND ORGANIC DEPOSIT INHIBITOR/DISPERSANT FOR THERMAL RECOVERY OPERATIONS OF HYDROCARBON FUELS

(71) Applicant: Ecolab USA Inc., St. Paul, MN (US)

(72) Inventors: John E. Hoots, Batavia, IL (US);
Edward Maharajh, Calgary (CA);
Anthony G. Sommese, Wheaton, IL (US); Timothy S. Keizer, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 87 days.

(21) Appl. No.: 15/196,779

(22) Filed: Jun. 29, 2016

(65) Prior Publication Data
US 2017/0001894 A1 Jan. 5, 2017

Related U.S. Application Data

(60) Provisional application No. 62/187,216, filed on Jun. 30, 2015.

(51) Int. Cl.
| | |
|---|---|
| *C11D 9/24* | (2006.01) |
| *C11D 3/18* | (2006.01) |
| *C11D 3/43* | (2006.01) |
| *C02F 5/14* | (2006.01) |
| *C02F 5/10* | (2006.01) |
| *C11D 7/26* | (2006.01) |
| *C11D 7/50* | (2006.01) |
| *C11D 11/00* | (2006.01) |
| *C11D 3/37* | (2006.01) |
| *C02F 101/10* | (2006.01) |
| *C02F 103/10* | (2006.01) |

(52) U.S. Cl.
CPC .......... *C02F 5/14* (2013.01); *C02F 5/10* (2013.01); *C11D 3/3703* (2013.01); *C11D 3/3707* (2013.01); *C11D 7/263* (2013.01); *C11D 7/5027* (2013.01); *C11D 11/0041* (2013.01); *C02F 2101/10* (2013.01); *C02F 2103/10* (2013.01); *C02F 2303/10* (2013.01); *Y02W 10/30* (2015.05)

(58) Field of Classification Search
CPC ....... C11D 11/0041; C11D 9/24; C11D 1/008; C11D 3/18; C11D 3/187; C11D 3/2068; C11D 3/3707; C11D 3/43; C11D 7/264; C11D 7/5004; C11D 7/5027; C11D 7/509; C11D 9/225; C11D 7/247
See application file for complete search history.

(56) References Cited

U.S. PATENT DOCUMENTS

| | | | |
|---|---|---|---|
| 4,949,743 A * | 8/1990 | Broom | B01F 17/0085 |
| | | | 137/13 |
| 6,815,404 B2 | 11/2004 | Becker | |
| 7,029,553 B1 | 4/2006 | Williams et al. | |
| 7,658,805 B2 | 2/2010 | Netherton | |
| 7,828,908 B1 | 11/2010 | Miralles | |
| 8,034,253 B2 | 10/2011 | Monzyk et al. | |
| 8,093,197 B2 | 1/2012 | Artiga-Gonzalez et al. | |
| 8,252,122 B2 | 8/2012 | Haake et al. | |
| 8,389,453 B2 | 3/2013 | Thomson | |
| 8,398,781 B2 | 3/2013 | Herdt et al. | |
| 8,598,094 B2 | 12/2013 | Welton et al. | |
| 8,758,520 B2 | 6/2014 | Monsrud et al. | |
| 8,796,195 B2 | 8/2014 | Thomson | |
| 8,986,418 B1 | 3/2015 | Miller et al. | |
| 9,103,038 B2 | 8/2015 | Mohs et al. | |
| 9,562,188 B2 | 2/2017 | Monroe et al. | |
| 2004/0033919 A1 | 2/2004 | Ruhr et al. | |
| 2005/0181966 A1 | 8/2005 | Micciche et al. | |
| 2005/0211274 A1 | 9/2005 | Jansen et al. | |
| 2006/0079424 A1 | 4/2006 | Perry | |
| 2008/0076840 A1* | 3/2008 | Flatt | B01D 17/045 |
| | | | 516/144 |
| 2009/0176689 A1 | 7/2009 | Thomson | |
| 2009/0233819 A1 | 9/2009 | Fuller et al. | |
| 2009/0235730 A1 | 9/2009 | Alapati | |
| 2011/0079392 A1 | 4/2011 | Reyes | |
| 2012/0097392 A1 | 4/2012 | Reyes et al. | |
| 2012/0291818 A1 | 11/2012 | Monsrud et al. | |
| 2012/0325485 A1 | 12/2012 | Qu et al. | |

(Continued)

FOREIGN PATENT DOCUMENTS

| | | |
|---|---|---|
| RU | 2109805 C1 | 4/1988 |
| WO | 95/16006 | 6/1995 |
| WO | 00/32711 | 6/2000 |
| WO | 01/70922 A1 | 9/2001 |
| WO | 2006/013319 A1 | 2/2006 |
| WO | 2009/061487 A1 | 5/2009 |
| WO | 2009/121893 A1 | 10/2009 |
| WO | 2012/059714 A1 | 5/2012 |
| WO | 2014/004697 A2 | 1/2014 |
| WO | 2016/029089 A1 | 2/2016 |

OTHER PUBLICATIONS

Gallup, Darrell L, Investigations of organic inhibitors for silica scale control in geothermal brines, Geothermics 31 (2002) 415-430.

(Continued)

*Primary Examiner* — Charles Boyer
(74) *Attorney, Agent, or Firm* — Senniger Powers LLP (57) ABSTRACT

The present invention generally relates to methods for removing an organic deposit or for inhibiting deposition of deposit-forming comprising contacting a cleaning composition or an anti-coking composition with a surface. The surface can have an organic deposit or be susceptible to forming an organic deposit and the surface can be in contact with a liquid containing organics. The liquid can be produced from a thermal recovery system, and the surface can be an internal surface of a piece of steam-generating or vapor-generating equipment.

16 Claims, 5 Drawing Sheets

(56) References Cited

U.S. PATENT DOCUMENTS

| | | |
|---|---|---|
| 2013/0178405 A1 | 7/2013 | Thomson |
| 2013/0192639 A1 | 8/2013 | Everson et al. |
| 2014/0128294 A1 | 5/2014 | Gatlin et al. |
| 2015/0005204 A1 | 1/2015 | Alwattari et al. |
| 2015/0307788 A1* | 10/2015 | McDaniel .............. C10G 33/04 524/105 |
| 2016/0060576 A1 | 3/2016 | Batton et al. |
| 2016/0264844 A1 | 9/2016 | MacDonald, II |
| 2016/0272879 A1 | 9/2016 | Reddy et al. |

OTHER PUBLICATIONS

International Search Report dated Oct. 12, 2016 relating to PCT Patent Application No. PCT/US2016/040056, 7 pages.

International Search Report and Written Opinion of PCT/US2015/047085 dated Dec. 18, 2015, 13 pages.

International Search Report and Written Opinion dated Nov. 17, 2016 relating to PCT Patent Application No. PCT/US2016/047143, 14 pages.

International Search Report and Written Opinion dated Nov. 23, 2016 relating to PCT Patent Application No. PCT/US2016/047498, 17 pages.

Cao, Nahai et al., Wettability Alteration of Heavy-Oil-Bitumen-Containing Carbonates by Use of Solvents, High-pH Solutions, and Nano/Ionic Liquids, 2016 SPE Reservoir Evaluation & Engineering, OTC Brasil, Offshore Technology Conference, Rio de Janeiro, Brazil, Oct. 27-29, 2015, 9 pages.

Mohammed, Mohammedalmojtaba et al., Wettability alteration: A comprehensive review of materials/methods and testing the selected ones on heavy-oil containing oil-wet systems, Advances in Colloid and Interface Science 220 (2015) pp. 54-77.

Sakthivel, Sivabalan et al., Use of Aromatic Ionic Liquids in the Reduction of Surface Phenomena of Crude Oil-Water System and their Synergism with Brine, Industrial & Engineering Chemistry Research, 2015, 54 (3), pp. 968-978.

* cited by examiner

METAL SILICATE AND ORGANIC DEPOSIT INHIBITOR/DISPERSANT FOR THERMAL RECOVERY OPERATIONS OF HYDROCARBON FUELS

CROSS-REFERENCE TO RELATED APPLICATION

This application claims priority to U.S. Provisional Patent Application Ser. No. 62/187,216 filed on Jun. 30, 2015, the disclosure of which is incorporated herein by reference in its entirety.

FIELD OF THE INVENTION

The present invention generally relates to methods for removing an organic deposit or for inhibiting deposition of deposit-forming comprising contacting a cleaning composition or an anti-coking composition with a surface. The surface can have an organic deposit or be susceptible to forming an organic deposit and the surface can be in contact with a liquid containing organics. The liquid can be produced from a thermal recovery system, and the surface can be an internal surface of a piece of steam-generating or vapor-generating equipment.

BACKGROUND OF THE INVENTION

Unwanted deposits can occur in many industrial systems. For example, organic and silica/silicate deposits are a problem in some boilers and evaporators used in thermal recovery systems. The presence of deposits can significantly reduce system thermal efficiency and productivity, increase operating/maintenance costs, and in some cases lead to equipment failure. Steam generators and evaporators are especially prone to deposits due to operation at elevated temperatures, pH and increased cycles of concentration (COC).

In particular, deposits are prevalent in produced water (steam assisted gravity drainage (SAGD), steam flood, etc.) plant unit operations. For example, SAGD operations inject steam into geological formations to stimulate the production of bitumen or heavy hydrocarbon. Oil Sands deposits in Alberta, Canada represent an area where this process is extensively used. Pairs of horizontal wells are bored into the oil-containing formation. The upper well injects steam and the lower well which is positioned below the steam injection line, continuously extracts a complex emulsion. That emulsion contains bitumen and water. The emulsion is broken; the bitumen is sent for refining, while the produced water (separated from the emulsion) is treated and reused as feedwater for the steam generators.

This SAGD process for producing bitumen results in large volumes of organic-laden and silica-laden water. There are two options typically used for treating the returned produced water and supplemental makeup water for use as feedwater for steam generation. The first option is warm lime softening (WLS) and is the more traditional method for treating produced water. The treated water quality is poor relative to ABMA/ASME boiler feedwater standard guidelines. However, the use of once-through steam generators (OTSG) mitigates the need for high purity water. In a preferred operation mode of the OTSG, the feedwater can have less than 8000 mg/L total dissolved solids (TDS) and near zero total hardness and the silica ($SiO_2$) specification is typically less than 50 mg/L. The WLS/Ion exchange process can achieve these requirements.

Evaporation technology (in particular mechanical vapor compression (MVC)) is the second and newer option of water treatment. The main reason for using evaporators to treat produced water is to achieve a very high quality of water so a conventional drum boiler can be used instead of OTSG. However, in some cases, evaporators are used to clean extremely dirty produced water along with other waste streams and other water sources for use as feedwater in OTSG. As the industry looks to more and more recycled water, evaporators will play an important role in treating waste water for reuse. This can be accomplished because the evaporation technology is very robust and can be used on the more difficult to treat waste waters.

With evaporators, a high percentage of produced water is recovered as high quality boiler feedwater. High quality feedwater produced from evaporation enhances reliability of the steam generation equipment. The evaporator footprint is also significantly smaller than conventional WLS treatment.

Because of the nature of the water being treated, evaporators are likewise subject to deposition. Chemical treatment programs are used to minimize deposits, but evaporators can become fouled over time and cleaning is in order. Options for cleaning these systems are chemical in-situ programs or mechanical cleaning.

As a result of significant deposit formation that can occur in unit operations such as evaporators, opportunities exist to improve system operations by using an effective chemical cleaning program. One option to deal with declining performance of Mechanical Vapor Compression (MVC) evaporators or evaporators in general due to deposits is to implement a chemical wash. Chemical washes may not always be completely effective for dissolving deposits. Some types of cleaning chemistries can be hazardous to both equipment and personnel. If a chemical wash does not effectively dissolve tenacious deposits, then mechanical cleaning may need to be performed. Mechanical cleaning is very time consuming, expensive (e.g., for waste removal/labor costs), and can result in significant lost production. Thus, there is a continuing need for a new chemistry to remove and/or limit deposit formation.

SUMMARY OF THE INVENTION

One aspect of the invention is a method for removing an organic deposit or for inhibiting deposition of deposit-forming comprising contacting a cleaning composition or an anti-coking composition with a surface. The surface can have an organic deposit or be susceptible to forming an organic deposit and the surface can be in contact with a liquid containing organics. The liquid can be produced from a thermal recovery system, and the surface can be an internal surface of a piece of steam-generating or vapor-generating equipment. The cleaning composition can include an alkoxylated polymer, an alkoxy alcohol, and an aromatic solvent. The anti-coking composition can include an alkyl phosphate ester, and an aromatic solvent.

Other objects and features will be in part apparent and in part pointed out hereinafter.

BRIEF DESCRIPTION OF THE DRAWINGS

FIGS. 4A to 4C show pictures of the heat transfer surface of the pilot scale boiler.

Corresponding reference characters indicate corresponding parts throughout the drawings.

DESCRIPTION OF THE PREFERRED EMBODIMENTS

The present invention is directed to methods for removing deposits. The cleaning compositions of the invention provide more effective cleaning of deposits, quicker turnaround for equipment, and reduce the need to mechanically clean the affected surfaces of the industrial system. In addition, the cleaning compositions are less hazardous than many alternative cleaning agents. Further, the cleaning compositions are particularly effective for cleaning steam generators, and evaporators. For example, the cleaning compositions are useful for cleaning steam generators, and evaporators that are used in thermal recovery systems. Particularly, the methods are used during processing produced water from SAGD, steam flood, and related processes.

The cleaning compositions described herein are effective for removing or inhibiting deposition of organics in steam generators and evaporators. Typically, the temperature in a steam generator is higher than the temperature of an evaporator when in use, and depending on the water chemistry, a person of skill in the art may have an expectation that the cleaning composition would be advantageous in an evaporator.

One aspect of the present invention is directed to a method for removing an organic deposit or for inhibiting deposition of deposit-forming comprising contacting a cleaning composition with a surface. The surface can have an organic deposit or be susceptible to forming an organic deposit and the surface can be in contact with a liquid containing organics. The liquid can be produced from a thermal recovery system, and the surface can be an internal surface of a piece of steam-generating or vapor-generating equipment. The cleaning composition can include an alkoxylated polymer, an alkoxy alcohol, and an aromatic solvent.

The cleaning composition can comprise an alkoxylated polymer. The alkoxylated polymer can be an alkoxylated alkylphenol polymer. Preferably, the alkoxylated polymer is an alkoxylated alkylphenol-formaldehyde polymer.

The alkylphenol-formaldehyde polymer can be prepared by condensing the alkylphenol and formaldehyde monomers in a molar ratio from about 0.5:1 to about 2:1; from about 0.6:1 to about 2:1; from about 0.7:1 to about 2:1; from about 0.8:1 to about 2:1; from about 0.9:1 to about 2:1; from about 0.75:1 to about 1.5:1; from about 0.9:1 to about 1.5:1; from about 0.9:1 to about 1.1:1; preferably, about 1:1.

Further, the alkoxylated polymer can be an ethoxylated nonylphenol-formaldehyde polymer.

The alkoxylated alkylphenol-formaldehyde polymer can be prepared by condensing an alkylphenol with formaldehyde followed by alkoxylation. The alkoxylation can be completed using a molar ratio of about 1 to about 10 moles, about 2 to about 10 moles, about 3 to about 10 moles, about 4 to about 10 moles, about 5 to about 10 moles, or about 6 to about 10 moles alkylene oxide per mole of the alkylphenol-formaldehyde polymer. Preferably, the alkoxylation is completed using a molar ratio of about 6 to about 10 moles alkylene oxide per mole of the alkylphenol-formaldehyde polymer.

Further, the ethoxylated nonylphenol-formaldehyde polymer can be prepared by condensing a nonylphenol with formaldehyde followed by ethoxylation. The ethoxylation is completed using a molar ratio of about 1 to about 10 moles, about 2 to about 10 moles, about 3 to about 10 moles, about 4 to about 10 moles, about 5 to about 10 moles, or about 6 to about 10 moles ethylene oxide per mole of the nonylphenol-formaldehyde polymer. Preferably, the ethoxylation is completed using a molar ratio of about 6 to about 10 moles ethylene oxide per mole of the nonylphenol-formaldehyde polymer.

The weight average molecular weight of the ethoxylated nonyl phenol-formaldehyde polymer is from about 4,000 to about 10,000 Daltons.

The preparation of the ethoxylated nonylphenol-formaldehyde polymer can be completed using from about 6 to about 10 moles ethylene oxide per mole of the nonyl-phenol-formaldehyde polymer and the weight average molecular weight of the ethoxylated nonyl phenol-formaldehyde polymer is from about 4,000 to about 10,000 Daltons.

A preferred alkoxylated polymer is an ethoxylated nonylphenol-formaldehyde polymer prepared using from about 8 to about 10 moles ethylene oxide per mole of the nonyl-phenol-formaldehyde polymer and having a weight average molecular weight of from about 4,000 to about 5,500 Daltons.

Alternatively, the alkoxylated polymer can be an ethoxylated nonylphenol-formaldehyde polymer prepared using from about 7 to about 8 moles ethylene oxide per mole of the nonyl-phenol-formaldehyde polymer and having a weight average molecular weight of the polymer of from about 7,500 to about 9,000 Daltons.

The ethoxylated nonylphenol-formaldehyde polymers can be prepared using standard polymerization techniques including those described in U.S. Pat. No. 4,949,743.

The cleaning composition can further comprise an aromatic hydrocarbon, an alcohol, or a combination thereof. The aromatic hydrocarbon can be a heavy aromatic naphtha, naphthalene, benzene, toluene, xylene, trimethylbenzene, ethylbenzene, or a combination thereof. Preferably, the aromatic hydrocarbon comprises heavy aromatic naphtha.

The alcohol in the cleaning composition can be an alkoxy-alcohol. Preferably, the alcohol is methoxymethanol, ethoxymethanol, propoxymethanol, butoxymethanol, pentoxymethanol, hexoxymethanol, methoxyethanol, ethoxyethanol, propoxyethanol, butoxyethanol, pentoxyethanol, hexoxyethanol, methoxypropanol, ethoxypropanol, propoxypropanol, butoxypropanol, pentoxypropanol, hexoxypropanol, or a combination thereof. More preferably, the alcohol is butoxymethanol, butoxyethanol, butoxypropanol, or a combination thereof.

The cleaning composition can comprise from about 30 wt. % to about 60 wt. % alkoxylated polymer (e.g., ethoxylated nonylphenol-formaldehyde polymer), from about 1 wt. % to about 20 wt. % alkoxy alcohol, from about 20 wt. % to about 60 wt. % heavy aromatic solvent (e.g., aromatic solvents having 9-16 carbon atoms and a boiling point from about 165-290° C.), and from about 5 wt. % to about 20 wt. % aromatic solvent (e.g., aromatic solvents having 6-8 carbon atoms).

The cleaning composition can also comprise from about 40 wt. % to about 50 wt. % alkoxylated polymer (e.g., ethoxylated nonylphenol-formaldehyde polymer), from about 1 wt. % to about 10 wt. % 2-butoxyethanol, from about 30 wt. % to about 50 wt. % naphtha, and from about 8 wt. % to about 15 wt. % xylene.

The cleaning composition can comprise from about 25 wt. % to about 55 wt. % ethoxylated nonylphenol-formaldehyde polymer, and from about 45 wt. % to about 75 wt. % aromatic solvent.

The cleaning compositions described herein are effective to remove organic deposits and to inhibit the deposition of organic deposits. The cleaning composition can be combined with agents that clean and/or inhibit inorganic deposits. For example, the agent for inorganic deposits can be a salt of a nitrogen base having a fluoro inorganic anion as disclosed in U.S. patent application Ser. No. 14/469,323 filed on Aug. 26, 2014.

The salt of a nitrogen base having a fluoro inorganic anion can have a fluoro inorganic anion comprising tetrafluoroborate, hexafluorophosphate, or a combination thereof. Additionally, the hydrolysis products of tetrafluoroborate and hexafluorophosphate that contain fluorine atoms can also be used.

Preferably, the fluoro inorganic anion comprises tetrafluoroborate.

The fluoro inorganic anion can comprise tetrafluoroborate and the nitrogen base can comprise urea and the molar ratio of urea to tetrafluoroboric acid used to prepare the salt can be 1:3 to 5:1, 1:2 to 5:1, 1:3 to 4:1, 1:2 to 4:1, 1:3 to 3:1 or 1:2 to 3:1; preferably, the ratio is 1:2 to 3:1. The nitrogen base (e.g., urea) can react with the fluoro inorganic acid (e.g., fluoroboric acid) to form the salt of a nitrogen base having a fluoro inorganic anion (e.g., urea tetrafluoroborate). The nitrogen base can be urea, biuret, an alkyl urea, an alkanolamine, an alkylamine, a dialkylamine, a trialkylamine, an alkyltetramine, a polyamine, an acrylamide, a polyacrylamide, a vinyl pyrollidone, a polyvinyl pyrollidone, or a combination thereof.

The salt of a nitrogen base having a fluoro inorganic anion is disclosed in U.S. Pat. Nos. 8,389,453 and 8,796,195 and is available commercially from Nalco-Champion, Sugar Land, Tex.

Another aspect of the present invention is a method for inhibiting deposition of deposit-forming organics comprising contacting an anti-coking composition with a surface. The surface being susceptible to forming an organic deposit from contact with a liquid containing organics, the liquid being produced from a thermal recovery system, and the surface being an internal surface of a piece of steam-generating or vapor-generating equipment. The anti-coking composition comprises an alkyl phosphate ester, and an aromatic solvent.

The anti-coking composition can contact the surface before the surface contacts a liquid containing organics.

The anti-coking composition can comprise from about 20 wt. % to about 75 wt. % alkyl phosphate ester, and from about 20 wt. % to about 55 wt. % aromatic solvent.

The anti-coking composition can also comprise from about 30 wt. % to about 45 wt. % di(alkyl)phosphate (e.g., di(2-ethylhexyl)phosphate), from about 15 wt. % to about 30 wt. % monom(alkyl)phosphate (e.g., mono(2-ethylhexyl) phosphate), from about 24 wt. % to about 55 wt. % aromatic solvent (e.g., naphtha, trimethylbenzene, naphthalene, and the like).

The surface that contacts the cleaning composition or the anti-coking composition can be an internal surface of a piece of equipment used in a thermal recovery system.

The thermal recovery system can be a steam-assisted gravity drainage system, a steam flood system, a cyclic steam stimulation system, or a related method.

The piece of equipment containing the surface that contacts the cleaning composition can be a steam generator, an evaporator, a sump, a containment vessel, a pump, fluid transfer piping, tubing bundles, pass or path piping, floodbox or a distributor plate that used with a steam-assisted gravity drainage processing system. Preferably, the equipment containing the surface that contacts the cleaning composition can be a steam-generator, once-through steam generator (OTSG), once-thru heat recovery steam generator (HRSG), or an evaporator.

The methods using the cleaning composition can further comprise contacting an inorganic or organic inhibitor of silica or silicate deposition with the surface.

The methods using the cleaning composition or the anti-coking composition can further comprise contacting a corrosion inhibitor with the surface.

The piece of equipment containing the surface that contacts the anti-coking composition can be applied to the internal piping of a steam generator.

When the cleaning composition is used, the method can be used to remove an organic deposit.

When the cleaning composition or anti-coking composition is used, the method can be performed when the piece of equipment is off-line.

When the cleaning composition or anti-coking composition is used and the method is performed when the piece of equipment is off-line, the piece of equipment can be an evaporator or a steam generator.

When the cleaning composition or the anti-coking composition is used, the method preferably inhibits organic deposition.

When the cleaning composition is used, the method can be performed when the piece of equipment is on-line.

When the method uses a cleaning composition and is performed when the piece of equipment is on-line, the piece of equipment is an evaporator or a steam generator.

When added to the feedwater, the cleaning composition can have a concentration of from about 0.5 ppm to about 150 ppm, from about 0.5 ppm to about 125 ppm, from about 0.5 ppm to about 100 ppm, from about 0.5 ppm to about 75 ppm, from about 1 ppm to about 150 ppm, from about 1 ppm to about 125 ppm, from about 1 ppm to about 100 ppm, or from about 1 ppm to about 75 ppm, based on the total weight of the liquid containing organics. Preferably, when added to the feedwater, the cleaning composition can have a concentration of from about 1 ppm to about 75 ppm based on the total weight of the liquid containing organics.

If the cleaning composition is added at a point in the system wherein the feedwater has been cycled up (e.g., steam generator or evaporator), so the concentration of the cleaning composition added to the feedwater would be increased with each cycle. The cleaning composition could be added at a concentration as if the cleaning composition had been cycled up with the feed water, thus, an equivalent dose at the cycled up points would be the feedwater dose multiplied by the number of cycles. For example, if the feedwater was cycled up 1.5 times, the dosage of the cleaning composition added to the cycled up water would be from about 0.75 ppm to about 225 ppm, or preferably, from about 1.5 ppm to about 113 ppm. If the feedwater was cycled up 20 times, the dosage of the cleaning composition added to the cycled up water would be from about 10 ppm to about 3000 ppm, or preferably from about 20 ppm to about 1500 ppm. If the feedwater was cycled up 30 times, the dosage of the cleaning composition added to the cycled up water would be from about 15 ppm to about 4500 ppm; or preferably, from about 30 ppm to about 2250 ppm. If the feedwater was cycled up 60 times, the dosage of the cleaning composition added to the cycled up water would be from about 30 ppm to about 9000 ppm, or preferably, from about 60 ppm to about 4500 ppm.

When feedwater is recycled, the cleaning composition can concentrate in the system. Thus, depending on where the cleaning composition is added and the number of cycles, the cleaning composition can have a greater concentration than the 150 ppm disclosed herein. When added to the feedwater, the cleaning composition is added to have such a concentration and a person of skill in the art would know how to calculate an equivalent dose when the cleaning composition is added to another point in the system.

The anti-coking composition can have a concentration of from about 5 ppm to about 100 ppm, from about 5 ppm to about 90 ppm, from about 5 ppm to about 80 ppm, from about 5 ppm to about 75 ppm, from about 10 ppm to about 100 ppm, from about 10 ppm to about 90 ppm, from about 10 ppm to about 80 ppm, or from about 10 ppm to about 75 ppm, based on the total weight of the liquid used to contact the surface of the equipment. Preferably, the anti-coking composition can have a concentration of from about 10 ppm to about 75 ppm.

The anti-coking composition can be contacted with the surface, wherein the surface temperature is from about 0° C. to about 100° C. Preferably, the temperature of the surface contacting the anti-coking composition is from about 4° C. to about 80° C.; more preferably, the temperature of the surface contacting the anti-coking composition is from about 16° C. to about 60° C.

The anti-coking composition is preferably contacted with a surface of a steam generator when the steam generator is off-line (e.g., not in use) and the anti-coking composition is added to a rinse water contacted with the internal surfaces of the steam generator.

The method for inhibiting deposition of deposit-forming organics can be performed wherein the surface in contact with a deposit-forming organic compound is an internal surface of a steam generator, the steam generator is on-line (e.g., in use), and the cleaning composition is added to the feedwater. The steam temperature in the steam generator can be from about 285° C. to about 357° C.; preferably, from about 303° C. to about 336° C., or more preferably, from about 303° C. to about 327° C. A person of ordinary skill would know how a steam generator could be operated at these steam temperatures. In particular, a person of ordinary skill could have determined the temperature for saturated steam and specific pressures from ABB (Asea Brown Boyer), "Steam Tables: Properties of Saturated and Superheated Steam", 17$^{th}$ Printing, Values Reprinted from 1967 ASME Steam Tables, p. 11-12.

The method for inhibiting deposition of deposit-forming organics can also be performed wherein the surface in contact with a deposit-forming organic compound is an internal surface of a steam generator wherein the steam generator is off-line (e.g., not in use), the cleaning composition is added to the rinse or cleaning water that is flushed through the steam generator. Under this mode, the liquid temperature in the steam generator can be from about 0° C. to about 100° C.; preferably, from about 4° C. to about 80° C., or more preferably, from about 16° C. to about 60° C.

The method for inhibiting deposition of deposit-forming organics can be performed wherein the surface in contact with a deposit-forming organic compound is an internal surface of an evaporator, the evaporator is on-line (e.g., in use), and the cleaning composition is added to the feedwater of the evaporator. The temperature in the evaporator can be from about 60° C. to about 85° C. For addition to the cycled up water, the temperature of the evaporator can be from about 100° C. to about 110° C.

The method for inhibiting deposition of deposit-forming organics can be performed wherein the surface in contact with a deposit-forming organic compound is an internal surface of an evaporator, the evaporator is off-line (e.g., not in use), and the cleaning composition is added to the rinse or cleaning water that is flushed through the evaporator. The liquid temperature inside the evaporator can be from about 4° C. to about 85° C.

Exemplary Composition 1 (EC1) comprises an ethoxylated nonylphenol-formaldehyde polymer having a molar ratio of nonylphenol to formaldehyde of about 1:1 and a molar ratio of ethylene oxide to the nonylphenol-formaldehyde polymer of about 8.5:1 to about 9.5:1, with a weight average molecular weight of the polymer from about 4000 to about 5500 Daltons; the ethoxylated nonylphenol-formaldehyde polymer is present in the composition at a concentration of from 40-45 wt. %. EC1 further comprises 2-butoxyethanol (4-6 wt. %), heavy aromatic naphtha (37-40 wt. %), naphthalene (0.5-1.5 wt. %), trimethylbenzene (0.3-0.5 wt. %), and xylene (10-12 wt. %).

Exemplary Composition 2 (EC2) comprises an ethoxylated nonylphenol-formaldehyde polymer having a molar ratio of about 1:1 nonylphenol to formaldehyde and a molar ratio of ethylene oxide to nonylphenol-formaldehyde polymer of about 7:1 to about 8:1 and the weight average molecular weight of the polymer is from about 7500 to about 9000 Daltons; the ethoxylated nonylphenol-formaldehyde polymer is present in the composition at a concentration of from 32-37 wt. %. EC2 further comprises heavy aromatic naphtha (42-45 wt. %), trimethylbenzene (4-6 wt. %), ethylbenzene (2.5-4 wt. %), and naphthalene (0.5-2 wt. %).

Exemplary Composition 3 (EC3) comprises ethoxylated nonylphenol (10-13 wt. %), alkylbenzene sulfonic acid (34-38 wt. %), light aromatic naphtha (28-32 wt. %), trimethylbenzene (13-16 wt. %), and isopropanol (4-7 wt. %).

Exemplary Composition 4 (EC4) comprises ethoxylated nonylphenol (17-20 wt. %, ethoxylated castor oil (5-7 wt. %), methanol (25-28 wt. %), water (25-26 wt. %), isopropanol (1.5-2.5 wt. %), mercaptoethyl alcohol (2-3 wt. %), reaction product of tall oil with aminoethhyl ethanediamine and propenoic acid (6-8 wt. %), and benzyl dimethyl $C_{12}$-$C_{14}$ ammonium chloride (10-14 wt. %).

Exemplary Composition 5 (EC5) comprises methanol (32-35 wt. %), isopropanol (4-6 wt. %), mercaptoethyl alcohol (5-7 wt. %), reaction product of tall oil with aminoethhyl ethanediamine and propenoic acid (18-21 wt. %), benzyl dimethyl $C_{12}$-$C_{16}$ ammonium chloride (32-39.5 wt. %).

Exemplary Composition 6 (EC6) comprises dimethylamine-epichlorohydrin copolymer (50-55 wt. %) and water (45-50 wt. %).

Exemplary Composition 7 (EC7) comprises di(2-ethylhexyl)phosphate (36-39 wt. %), mono(2-ethylhexyl)phosphate (21-24 wt. %), light aromatic naphtha (9-11 wt. %), trimethylbenzene (5-7 wt. %), and naphthalene (2-3 wt. %).

The application site for use of the composition can have more than one two-stage evaporators running in parallel. The evaporators operate based on the MVC principle. The primary and secondary stages of each evaporator operate in series. As a person of ordinary skill would understand the cleaning composition would be effective when used in other evaporator system designs.

Figure 1:
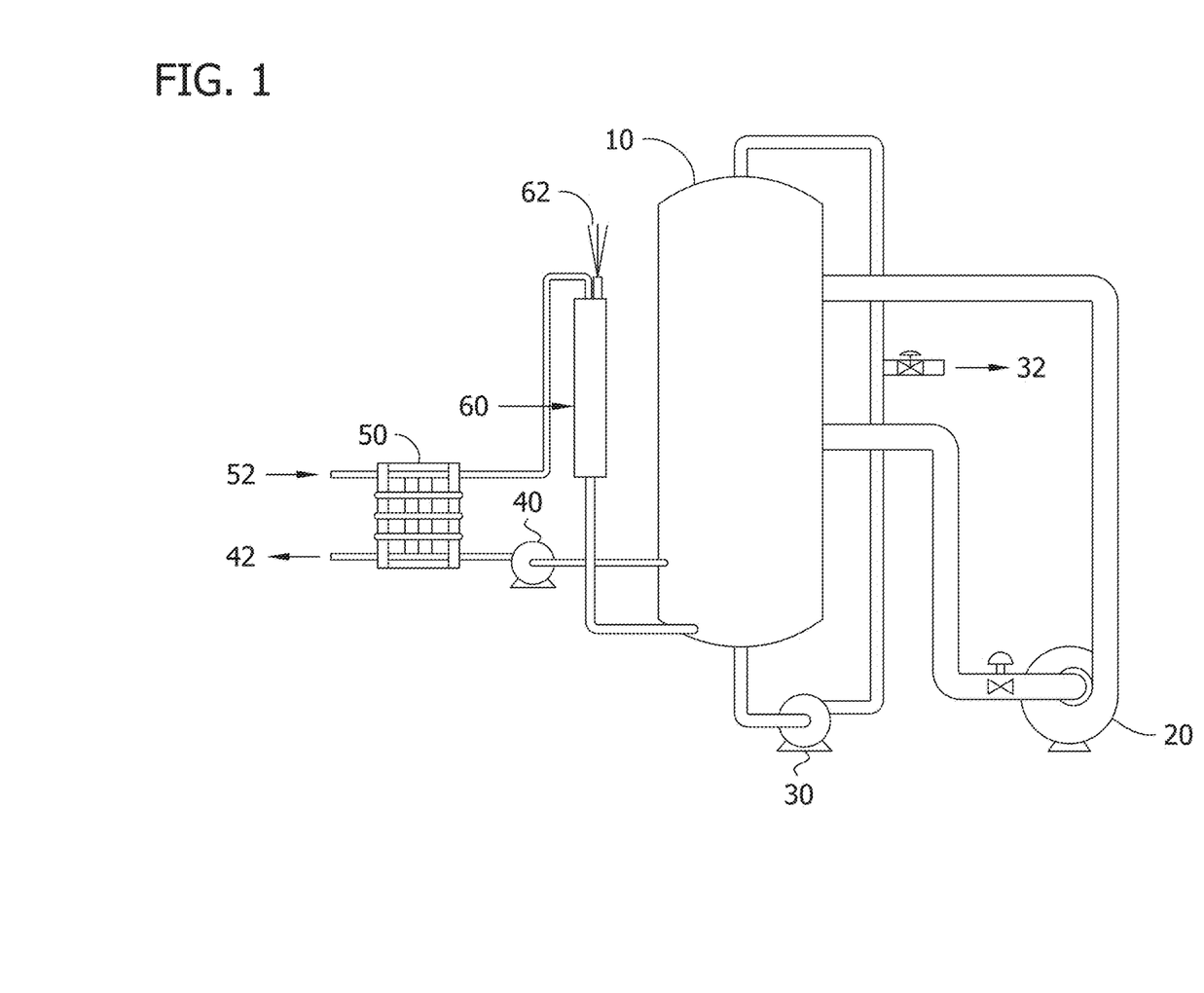
FIG. 1 is a schematic of an evaporator system based on MVC operation.

FIG. 1 shows the major components in an evaporator system. A vapor compression evaporator (or brine concentrator) 10 can contain various internal structures including tube bundles and brine distributors. The vapor compression evaporator 10 is connected to a compressor 20, a recirculation pump 30, a blowdown line with a control valve 32, a deaerator 60 having a vent 62, and a distillate pump 40. Feedwater 52 is fed through a heat exchanger 50 into the deaerator 60 and into the vapor compression evaporator 10. The distillate 42 exits the vapor compression evaporator 10 into a distillate pump 40 and through the heat exchanger 50. The brine is recirculated through the recirculation pump 30 and waste brine exits the waste brine blowdown line and valve 32. Evaporated water is compressed by circulating through the compressor 20.

The typical operating characteristics for an evaporator system like the one shown in FIG. 1 are detailed in Table 1.

TABLE 1

Typical Operating Characteristics (approx.)

| Parameter | Smaller System | Larger System |
|---|---|---|
| Feedwater Flow (m3/hr) | 250 | 300 |
| Tube Bundle Surface Area (m$^2$) | 12,000 | 12,000 |
| Feedwater Temp. (° C.) | 80 | 80 |
| Sump Temp. (° C.) | 105 | 105 |
| Total Distillate (m3/hr) | 244-245 | 293-294 |
| Blowdown Rate (m3/hr) | ~5-6 | ~6-7 |
| Total Cycles of Concentration (target) | 45-55 | 45-55 |

Falling film MVC evaporators have high heat transfer characteristics and efficiency compared to other evaporator designs (Heins, W. (2008). Technical Advancements in SAGD Evaporative Produced Water Treatment, *International Water Conference in San Antonio, Tex.*, October 26-30, IWC-08-55). A high heat transfer coefficient is required to effectively evaporate the water and increase the temperature (ΔT~27° C. at application site) to produce high quality distillate for use as source of feedwater for other unit operations (for example: OTSGs). Along with the evaporative process, the concentration of substances present in the feedwater can be cycled up as high as 45-55 times their initial concentration. The combination of higher temperature and higher concentrations of inorganic and organic substances increases the probability that the inversely soluble and particulate substances will deposit on wetted portions of evaporator system.

Thus, clean heat-transfer surfaces are very desirable for energy-efficient production of distillate from water that contains high levels of inorganic salts and organic contaminants. When deposits form insulating layers on heat-exchanger surfaces of evaporators, a reduction in U-values (heat-transfer coefficient) occurs. While operating conditions of the evaporator can be adjusted within limits to compensate for the decrease in U-values, low U-values at some point lead to reduction of distillate flow rate and de-rating of the evaporator operation. If insufficient distillate is available for plant operation (feed water for OTSGs and heat recovery steam generators (HRSGs)), then bitumen production can be reduced.

In addition to reducing evaporator heat-transfer efficiency and corresponding production of distillate, deposits can block heat-transfer tubes, distribution plates, and flow channels. System blockages can lead to poor distribution of water, further reduction in distillate production and make cleaning the system, even with mechanical means, very difficult, costly, labor-intensive, and time-consuming.

In thermal-recovery of bitumen operations, complex mixtures of waters (e.g., produced water, various recycled water streams, and brackish water) are combined to form evaporator feedwater. The ratios of the various water streams and their chemical compositions can vary greatly over time. Further, the drive to maximize efficiency of water usage and reduce water discharge via the increased level of water recycling can lead to increasing levels of deposit-forming ions and substances over time. This is sufficient to impede evaporator operation.

The average evaporator feedwater quality for five months of operation and the impact of operating at total cycles of concentration of 45 are shown in Table 2. The inorganic portion of water chemistry was measured by inductively-coupled plasma (ICP) spectroscopy.

TABLE 2

Evaporator Feedwater Quality and Impact of Cycles of Concentration

| | Concentration (mg/L) | |
|---|---|---|
| Chemistry* | Feedwater | @ 45 cycles** |
| Aluminum (as Al) | 0.23 | 10.4 |
| Calcium (as Ca) | 2.24 | 101 |
| Magnesium (as Mg) | 0.58 | 26.1 |
| Ca + Mg Hardness (as CaCO$_3$) | 8.0 | 360 |
| Silica (as SiO$_2$) | 244 | 10,980 |
| TOC | 760 | 34,200 |

*Additional ions at high concentrations in the feedwater are boron ~29 mg/L, Na$^+$ ~690 mg/L, Cl$^-$ ~210 mg/L, and sulfate ~280 mg/L
**Assumes 100% Transport, deposit formation will result in lower concentrations measured in evaporator blowdown.

Even though evaporator systems are operated at relatively high pH (e.g., feedwater pH is about 10.6, primary system pH is about 12.0, and secondary system is about 12.3), the combination of organics, aluminum, hardness, and silica ions shown in Table 2 can and did result in a deposit forming over time. Due to the large volume of feedwater (e.g., 250-300 m$^3$/hour target rate per evaporator) passing through the system, every mg/L of inorganic or organic material that is deposited from feedwater corresponds to 250-300 grams/hour or 2.2-2.6 metric tons/year deposited in each evaporator.

Due to water recycling and the need to maximize water usage, levels of deposit-forming inorganic ions and organics in feedwater increased over time.

When hydroblasting is used to remove internal deposits, the evaporator system is taken off-line, and cooled and drained of internal aqueous fluid. An entry hatch is opened and personnel/equipment for hydroblasting taken in to the evaporator system. Using a high-pressure water wash lance (hydroblasting), high-pressure water is used to remove deposits and scour the internal surfaces. The deposits removed from the internal surfaces are collected and taken out of the system for disposal. A longer high-pressure water lance is used to remove deposits from on the inside (e.g., tube-side) of long heat-transfer tubes (or tube bundle) portion of the evaporator. After the evaporator is cleaned, the entry port of the system is sealed up and feedwater is added to reach a normal operating level within the system. The water recirculation pumps are started and steam is typically added to the shell-side of heat-exchanger to heat the recirculating water. The mechanical vapor compression pump is started and the system is placed back on-line.

Having described the invention in detail, it will be apparent that modifications and variations are possible without departing from the scope of the invention defined in the appended claims.

EXAMPLES

The following non-limiting examples are provided to further illustrate the present invention.

Example 1

A sump water sample from evaporator primary at SAGD Location 1 was treated with 150 or 1000 ppm of potential organic deposit inhibitor treatment program (which corresponds to dosage of about 7.5 or 40 ppm in feedwater). The sump water sample started at about 20 cycles of concentration and was further concentrated to about 60 cycles (approximate maximum level of concentration in evaporator secondary sump water) by heating and stirring. The highly concentrated water sample was filtered, the weight of substances recovered on filter paper (e.g., dark colored, sticky solids) was measured, and the weight of substances was compared to that measured for a water sample without the added organic deposit inhibitor treatment.

TABLE 3

| Treatment | Dosage (ppm)* | % change in solids retained on filter paper vs. no treatment** |
|---|---|---|
| None | 0 | 0% |
| EC1 | 1000 | 78% decrease |
| EC1 | 150 | 15% decrease |
| EC2 | 1000 | 8% decrease |
| EC3 | 1000 | 4% decrease |
| EC4 | 1000 | 15% increase |
| EC5 | 1000 | 68% increase |
| EC6 | 1000 | 377% increase |

*150 ppm and 1000 ppm correspond to equivalent of 7.5 ppm and 40 ppm dosage added to feedwater, respectively.
**Reference point is no treatment (0% change), % decrease represents inhibition of organic particulates (with 100% decrease being best performance possible in this test) and % increase represents coagulation or lower inhibition level.

Results showed that EC1 was effective to limit precipitation of organic contaminants. This was consistent with previous field results in other application areas (produced water coolers) and an OTSG simulator test rig.

Example 2

Pilot Scale Boiler Tests

Pilot scale boiler tests were used to evaluate whether presence of EC1 or EC7 as a surface coating treatment on the firerod would have a positive or negative impact on deposit formation. Tables 4-5 indicate the operating conditions of pilot scale boiler tests (and how they compare to OTSGs) and water chemistry used (in comparison to SAGD Location 1 water chemistry). Typically pilot scale boilers are run at more operating severe conditions compared to customer applications being evaluated.

Pilot Scale Boiler (PSB) equipment is used to evaluate efficacy of treatment chemistries and combinations of those treatments. The equipment is also used to evaluate impact of changes in water quality and operating conditions. PSB equipment is designed to provide a rapid indication (within five days) of long-term behavior in larger plant unit operations.

Figure 2:
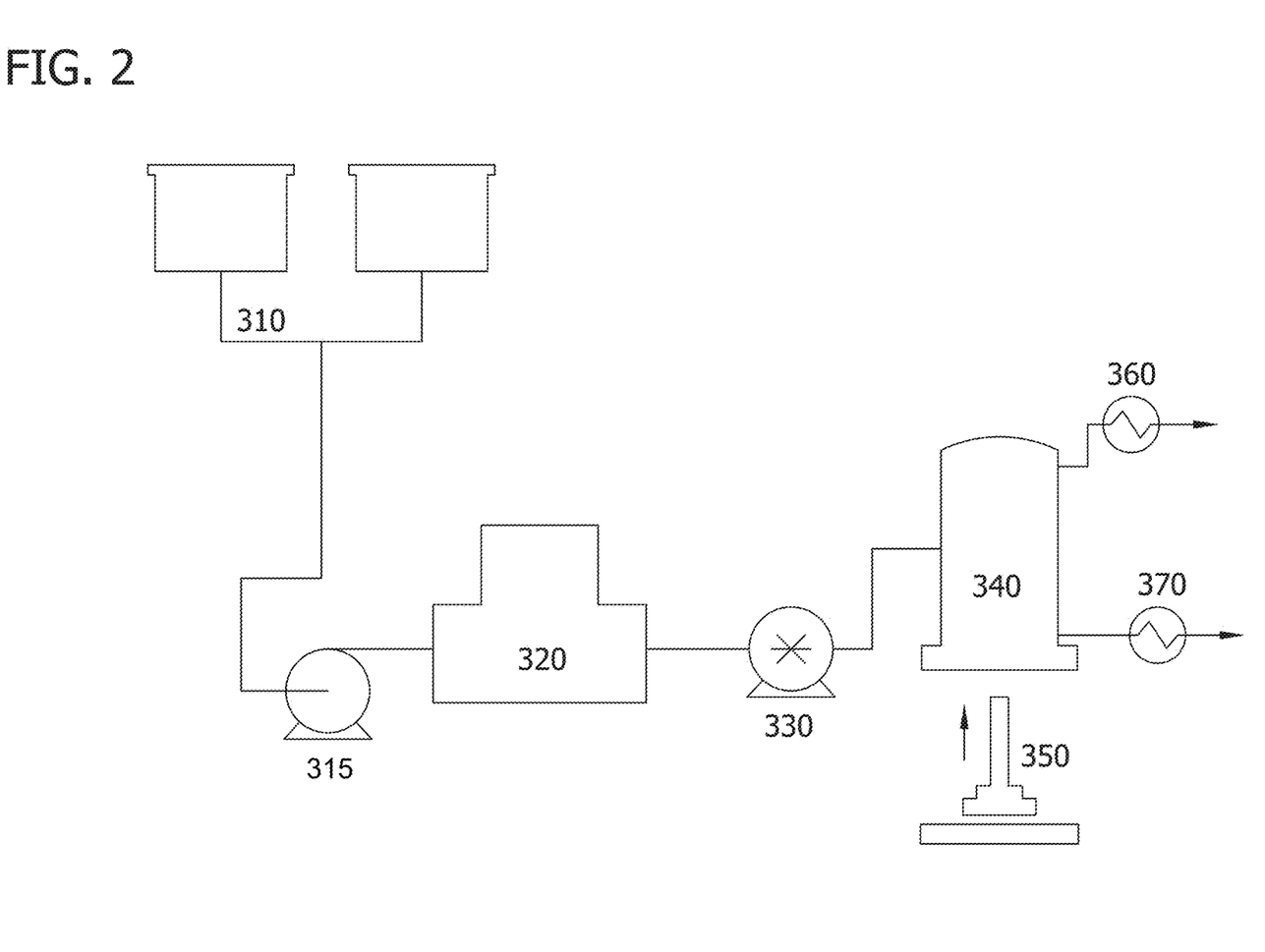
FIG. 2 is a schematic of a pilot scale boiler (PSB) system.

The PSB of FIG. 2 has feedwater fed from feed tanks 310, a pump 315 connecting the feed tanks 310 to the deaerator 320, a boiler feedwater (BFW) pump 330 connecting the deaerator 320 and the boiler 340, a firerod 350 contained in the boiler 340, a condensate exit stream 360 and a blowdown stream 370. The treatment program is typically added to the feedwater upstream of the feedwater pump 330. The PSB equipment provides a more convenient means of obtaining data and a person of ordinary skill in the art would have understood that these agents would also be effective for use in once-through steam generators.

During testing of treatment chemistries and operating conditions, PSB equipment was run under more severe/stressed conditions (water chemistry, heat flux, and residence time) than SAGD plant boilers and steam-generators, in order to reduce the time required to determine results (Table 4).

TABLE 4

Typical comparative operating conditions for PSB test versus OTSG

| Parameter | Pilot Scale Boiler | Location #1 |
|---|---|---|
| Design | Drum | OTSG |
| Energy Source | Electrically-heated fire rod | Natural Gas |
| Steam Pressure | 10,340 kPa (1500 psig) | 9,653 kPa (1400 psig) |
| Steam Temperature | 314° C. (598° F.) | 309° C. (589° F.) |
| Initial Heat Transfer Tube Wall Temperature | up to 344° C. (up to 652° F.) | — |
| Heat Flux | up to 361 kW/m$^2$ (114,000 BTU/ft$^2$/hr) | 47-125 kW/m$^2$ or 15,000-40,000 BTU/ft$^2$/hour |
| 50% Holding Time (or Residence Time) | ~1.5 hours | <2 minutes (estimate) |
| Concentration Cycles (or Steam Quality | 10 | 5 (80% quality) |

Water chemistry used for PSB tests is summarized in Table 5. The tests run at 10 cycles of concentration and the water inside the PSB (measured as blow down) will be 10 times more concentrated in all of the feed water chemistries—if no deposition occurs. The feedwater chemistry and PSB cycles of concentration were chosen to provide water chemistry that is representative very severe operating conditions of steam-generator, OTSG or once-through HRSG in Oil Sands applications. Some plants may have higher or lower concentrations of specific chemistries in OTSG blowdown and PSB tests are readily adaptable to test a wide range of water chemistries and operating conditions.

TABLE 5

Pilot scale boiler chemistry (mg/L) (feedwater and 10 X cycles of concentration) vs. OTSG*

| Chemistry of Property | PSB Feedwater x10 Cycles (mg/L) | Location #1 Blowdown at 80% Steam Quality* |
|---|---|---|
| Calcium (as Ca) | 1.2 | 0.3 |
| Magnesium (as Mg) | 1.0 | 1.0 |
| Silica (as SiO2) | 300 | 138 |
| Sodium (as Na) | 2,600 | 4,095 |
| Chloride (as Cl) | 3,870 | 4,530 |
| Lithium (as Li) | 6.0 | 5.0 |

As shown in Table 5, the water quality used for PSB tests at 10 cycles of concentration is generally more severe than SAGD Location #1 operating at 80% steam quality (4 cycles of concentration) and is suitable for doing accelerated testing with equipment such as PSB.

Figure 3:
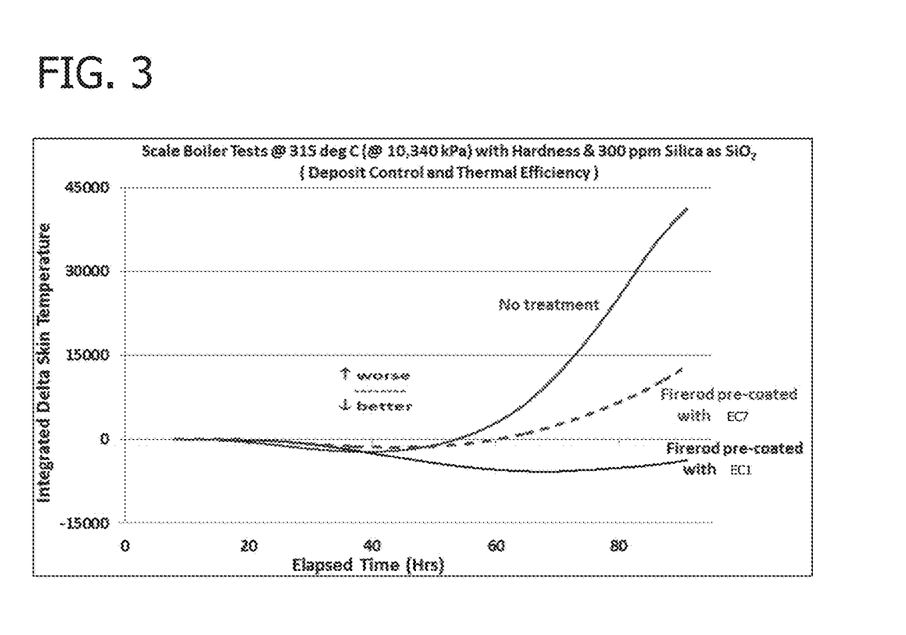
FIG. 3 is a graph of the integrated delta of the skin temperature versus time showing the thermal efficiency in the pilot scale boiler with and without pretreatment of the heat transfer surface.

FIG. 3 and Table 6 summarize the favorable results observed from pre-coating the heat-transfer surface (with either EC7 or EC1) of pilot scale boiler prior to start of testing. Larger numbers in FIG. 3 indicate the cumulative effect (Integrated Delta Skin Temperature) of insulating deposits forming on heat-transfer surface and that tube wall temperature rises in order to maintain steam temperature/rate of boiling (refer to "no treatment" test). Heat-transfer surface pre-coated with EC7 showed ability to limit temperature rise of that surface from deposits over more than 90 hours of testing, as compared to untreated test. Heat-transfer surface pre-coated with EC1 showed ability to prevent any net temperature rise of that surface from deposits over more than 90 hours of testing, as compared to the untreated test.

Table 6 shows that deposit rate (g/m² hr) forming on heat-transfer surface was noticeably less for surfaces pre-coated with EC7 or EC1. Since cumulative heat-transfer efficiency (FIG. 3) can be impacted by several factors (including thermal conductivity of deposit, surface roughness and surface area), relative trends observed in FIG. 3 and Table 6 may not always be consistent. However, it is the overall positive effect (or not) of treatment chemistry that is considered—based on several different ways to measure performance.

TABLE 6

Pilot scale boiler performance results for variety of treatment options

| Heat-Transfer Surface Pre-treatment | Deposit Rate (g/m² hr) | Ease of removal | Glassy Deposit |
|---|---|---|---|
| None | 0.468 * | Difficult | Yes |
| EC7 | 0.359 | Easy/moderate | No |
| EC1 | 0.421 | Easy/Moderate | No |

* Deposit rate is based on deposit removed from heat transfer surface by scraping after pilot scale boiler test completed. True deposit rate for "No Treatment" test is actually noticeably larger than number shown due to glassy deposit present that could not be removed by scraping and was not counted.

Figure 4A:
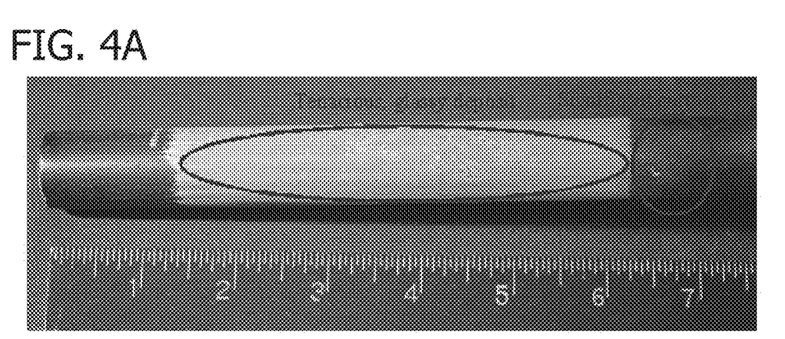
FIG. 4A shows the surface with no pre-treatment.
Figure 4B:
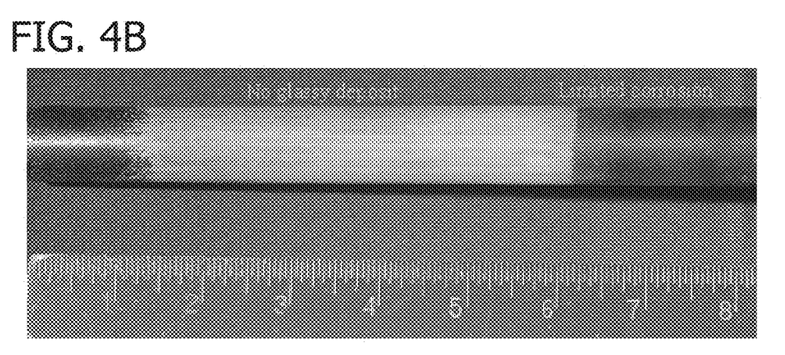
FIG. 4B shows the surface with pre-treatment with Exemplary Composition 1 (EC 1) and 4C shows the surface with pre-treatment with Exemplary Composition 7 (EC7).
Figure 4C:
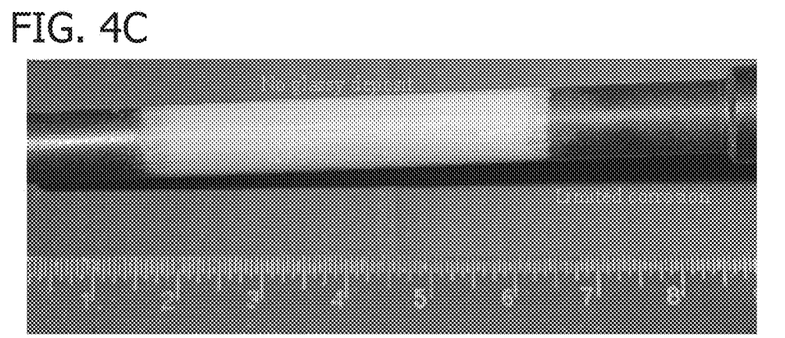

Pilot scale boiler tests were used to evaluate whether presence of EC1 as a BFW treatment may have a positive or negative impact on deposit formation (FIG. 4). Operating conditions were the same as previous set of pilot scale boiler tests, except that treatment chemistry was added to BFW rather than being used to pre-coat heat-transfer surface prior to start of test.

Figure 5:
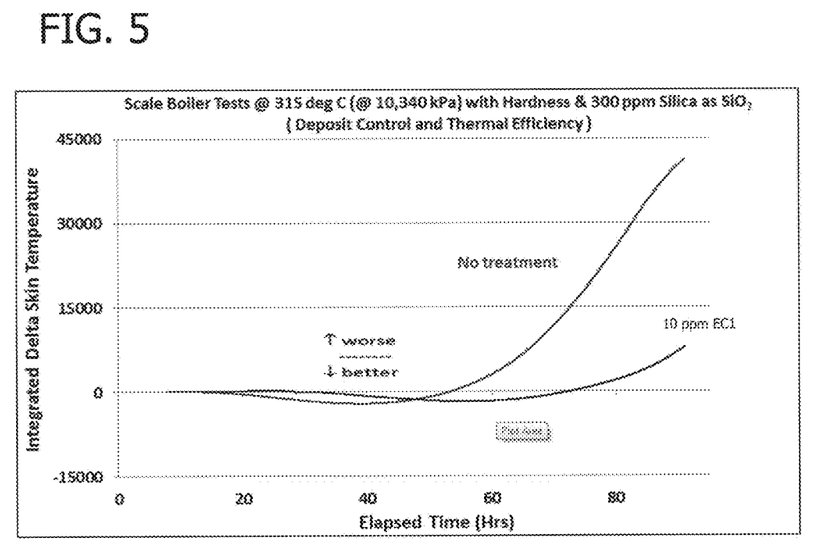
FIG. 5 is a graph of the integrated delta of the skin temperature versus time showing the thermal efficiency in the pilot scale boiler with and without treatment of the boiler feed water (BFW) with EC1.

FIG. 5 and Table 7 summarize the favorable results observed from adding 10 mg/L of EC1 to BFW of pilot scale boiler. Larger numbers in FIG. 5 indicate the cumulative effect (Integrated Delta Skin Temperature) of insulating deposits forming on heat-transfer surface and that tube wall temperature rises in order to maintain steam temperature/rate of boiling (refer to "no treatment" test). Addition of EC1 to BFW showed ability to reduce net temperature rise of that surface from deposits over more than 90 hours of testing, as compared to the untreated test.

Table 7 shows that deposit rate (g/m² hr) forming on heat-transfer surface was measurably less for pilot scale boiler test using 10 ppm of EC1 as BFW treatment.

TABLE 7

Deposit Weight Results in Pilot Scale Boilers - Addition of Treatment to BFW

| Boiler Feedwater Treatment | Deposit Rate (g/m2 hr) | Ease of removal | Glassy Deposit |
|---|---|---|---|
| None | 0.468 * | Difficult | Yes |
| EC1 (10 ppm) | 0.371 | Easy | No |

* Deposit rate is based on deposit removed from heat transfer surface by scraping after pilot scale boiler test completed. True deposit rate for "No Treatment" test is actually noticeably larger than number shown due to glassy deposit present that could not be removed by scraping and was not counted.

Example 3: Pigging Deposit Extraction Results

In order to evaluate whether EC1 exhibited ability to extract organics from existing OTSG deposits, a sample of a pigging deposit from OTSG Location A was added to boiling solution containing EC1. The mixture was boiled and stirred vigorously for one hour, with water being added to replace any evaporation losses. After that one hour time period, test sample was filtered to remove any visible amounts of suspended or insoluble materials. A comparable "blank" test was run using the same procedure, but no treatment was used. Organics were extracted from the pigging deposit by EC1 and showed a brown colored solution, whereas untreated test solution showed no visible coloration.

Light absorbance readings at 290, 350 and 450 nm (Table 8) on the blank and EC1 treated solutions confirmed the visual results. Larger light absorbance readings are associated with higher level of organics. Light absorbance at shorter wavelength (290 nm) is typically associated with smaller organic molecules and simple aromatics. Light absorbance at longer wavelengths (350, 450 nm) are typically associated with larger and more complex organic molecules and aromatics. At each wavelength measured, the EC1 treated solution exhibited three to ten times larger light absorbance due to organics extracted from pigging deposit sample vs. test solution without chemical treatment added.

TABLE 8

Light Absorbance from Organics Solution in Extraction of Pigging Deposit with Boiling Water

| | Light Absorbance (A) | | |
|---|---|---|---|
| Treatment Used | 290 nm | 365 nm | 450 nm |
| No Treatment | 0.105 | 0.037 | 0.015 |
| 100 ppm EC1 | 0.311 | 0.235 | 0.163 |

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method for removing an organic deposit, or for inhibiting the deposition of deposit-forming organics on a surface, comprising contacting said surface with a cleaning composition comprising:
   a) an alkoxylated alkylphenol-formaldehyde polymer;
   b) an alkoxy alcohol; and
   c) at least one aromatic solvent;
   wherein said surface contains an organic deposit, or is susceptible to forming an organic deposit when said surface is in contact with a liquid containing organics, wherein said liquid is being produced from a thermal recovery system, and wherein said surface is an internal surface of a piece of steam-generating or vapor-generating equipment.

2. The method of claim 1 wherein the alkoxylated polymer comprises an ethoxylated nonylphenol-formaldehyde polymer.

3. The method of claim 2 wherein the nonylphenol-formaldehyde polymer has a molar ratio of nonylphenol to formaldehyde of about 1:1.

4. The method of claim 3, wherein the molar ratio of ethylene oxide to nonylphenol-formaldehyde polymer is from about 6:1 to about 10:1.

5. The method of claim 4, wherein the molecular weight of the ethoxylated nonylphenol polymer is from about 4000 to about 10000 Daltons.

6. The method of claim 5, wherein the molar ratio of ethylene oxide to nonylphenol-formaldehyde polymer is from about 8:1 to about 10:1 and the molecular weight of the polymer is from about 4000 to about 5500 Daltons.

7. The method of claim 1 wherein the cleaning composition comprises:
   a) from about 30 wt % to about 60 wt. % of said alkoxylated alkylphenol-formaldehyde polymer;
   b) From about 1 wt. % to about 20 wt. % alkoxy alcohol;
   c) from about 20 wt % to about 60 wt. % of a heavy aromatic solvent; and
   d) from about 5 wt % to about 20 wt. % additional aromatic solvent.

8. The method of claim 7 wherein the cleaning composition comprises:
   a) from about 40 wt. % to about 50 wt % of said alkoxylated alkylphenol-formaldehyde polymer;
   b) from about 1 wt % to about 10 wt % 2-butoxyethanol;
   c) from about 30 wt. % to about 50 wt % naphtha; and
   d) from about 8 wt % to about 15 wt % xylene.

9. The method of claim 1 wherein the piece of steam-generating or vapor-generating equipment is a steam generator, a tube bundle, an evaporator, a sump, a containment vessel, a pump, or a distributor plate.

10. The method of claim 9 wherein the equipment is a once-through steam generator (OTSG), a once-through heat recovery steam generator (HRSG), or an evaporator.

11. The method of claim 10 wherein the piece of equipment is an evaporator or a once-through steam generator.

12. The method of claim 1 wherein the method further comprises contacting said surface with an inorganic or organic compound that inhibits the deposition of silica or silicate on said surface.

13. The method of claim 1 wherein the method is performed when the piece of equipment is off-line.

14. The method of claim 1 wherein the method is performed when the piece of equipment is on-line.

15. The method of claim 1 wherein the cleaning composition has a concentration of from about 0.5 ppm to about 150 ppm based on the total weight of the liquid containing organics.

16. The method of claim 1 wherein the piece of equipment is used in a thermal recovery system.

* * * * *